Patented Dec. 15, 1942

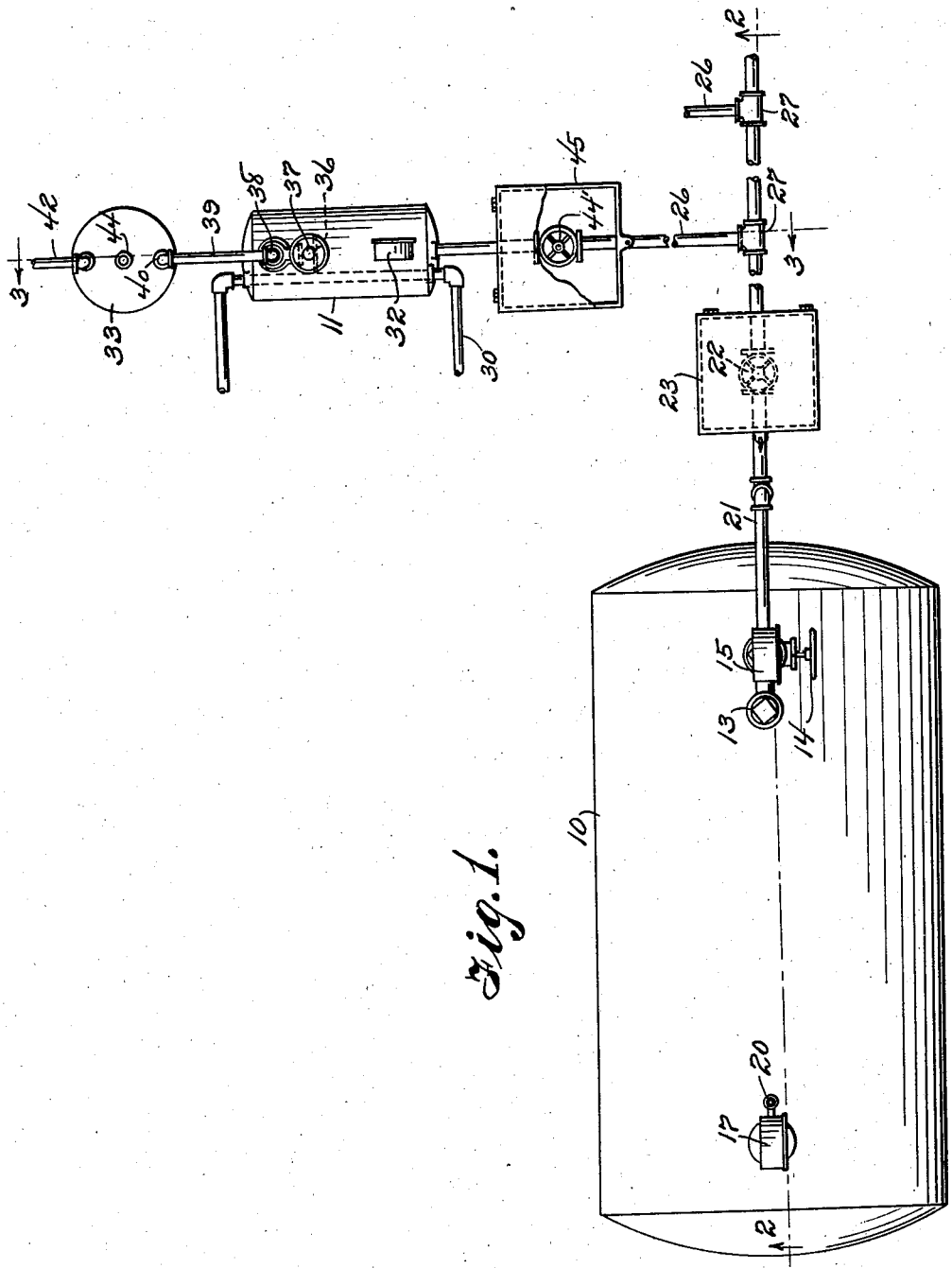

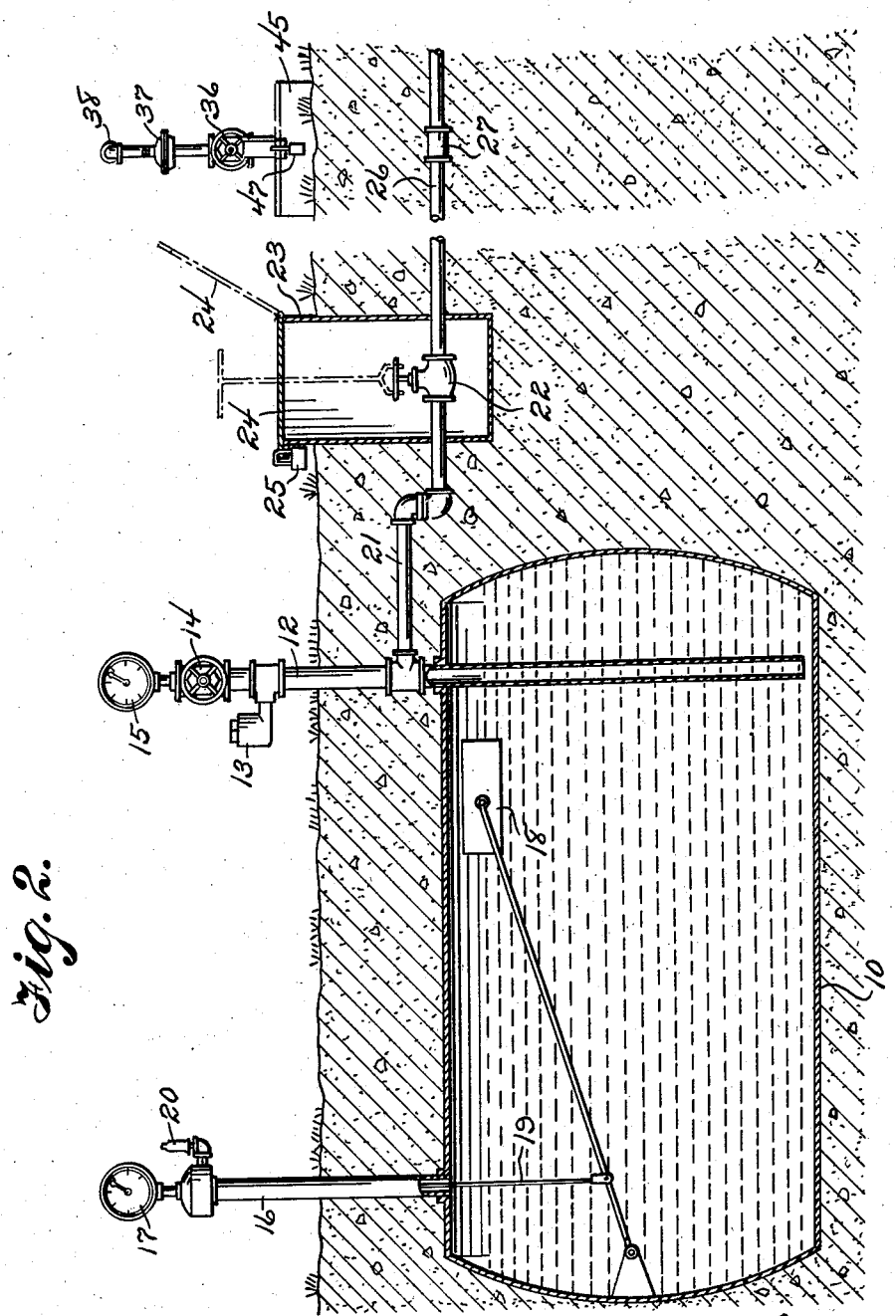

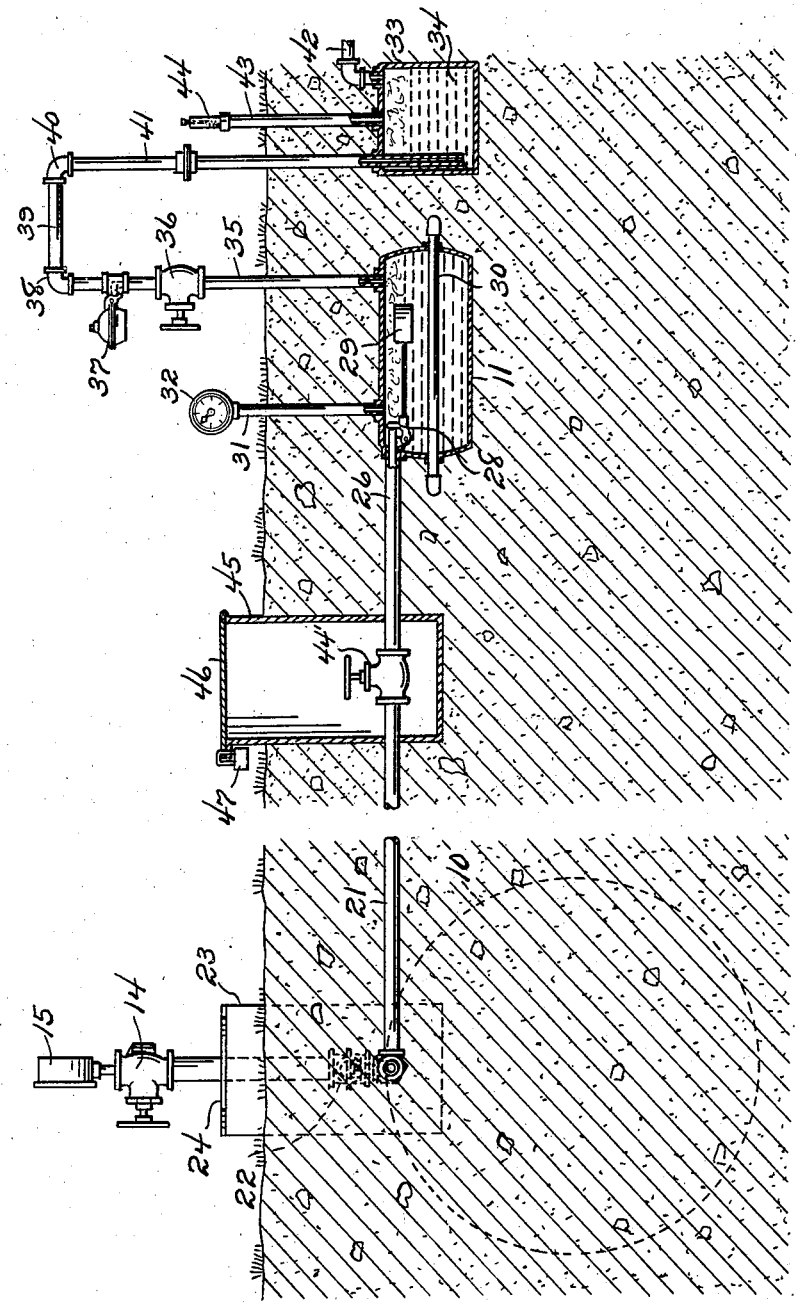

2,305,314

UNITED STATES PATENT OFFICE 2,305,314

GAS SERVICING PLANT

George W. Little, San Antonio, Tex., assignor, by mesne assignments, to Southern Steel Company, San Antonio, Tex., a corporation of Texas Application November 26, 1935, Serial No. 51,717

5 Claims. (Cl. 62—1)

This invention relates to gas plants and has for an object to provide apparatus adapted to furnish gas to individuals and to commercial users to whom natural gas cannot be furnished because of inaccessibility to a natural gas field, or because the community or place is not of sufficient population to pay for piping natural gas.

A further object is to provide apparatus adapted to furnish gas under the above recited circumstances, adapted to be consumed as is natural gas, and to be used with the same furnishings and equipment as is used in the consumption of natural gas.

A further object is to provide apparatus including a supply tank and a gasifier adapted to change butane, or other liquids into gaseous form.

With the above and other objects in view the invention consists of certain novel details of construction and combinations of parts hereinafter fully described and claimed, it being understood that various modifications may be resorted to within the scope of the appended claims without departing from the spirit or sacrificing any of the advantages of the invention.

In the accompanying drawings forming part of this specification;

Figure 1 is a plan view of apparatus constructed in accordance with the invention.

Figure 2 is a longitudinal sectional view taken on the line 2—2 of Figure 1.

Figure 3 is a cross sectional view taken on the line 3—3 of Figure 1.

Referring now to the drawings in which like characters of reference designate similar parts in the various views, 10 designates a tank which, in practice, is designed to serve as the central supply tank for the community of users, each individual user having on his premises an individual tank 11 which is supplied with butane, or similar liquid from the central storage tank 10.

The central supply tank 10 is equipped with a filling pipe 12 which extends to nearly the bottom of the tank and is equipped with a filling tube 13 above the ground level. Above the filling tube the filling pipe is equipped with a cut-off valve 14 and above the valve the pipe is equipped with a pressure gage 15. The tank is also equipped with a liquid gauge tube 16 which is provided at the top with a liquid gauge 17 which may be of any conventional type, but in the present instance is shown to be of the type in which a float 18 is employed to actuate the stem 19 of the gauge. The liquid gauge tube is equipped with an air intake valve 20 through which air pressure may be maintained in the tank on top of the butane or other liquid to force the liquid under pressure out of the tank and into the filling pipe 12.

The tank 10 is shown as being buried in the ground from which it naturally absorbs heat to maintain the temperature of the liquefied gas therein approximately the same as that of the surrounding earth. It is well known that vapor pressure will exist in the tank, due to the temperature of the liquid. When air under pressure is charged into a full tank, the air pressure will naturally be superimposed upon the vapor pressure. Due to the small vapor space in a full tank, the superimposed air pressure will be very greatly diminished when the tank is nearly empty. Therefore, the vapor pressure in the tank due to the earth's temperature, serves to maintain the liquid discharging pressure in the tank until it is empty.

A main supply pipe 21 is connected to the filling pipe 12 and is equipped with a main cut-off valve 22 which is housed in a valve box 23 having a hinged cover 24 adapted to be locked against unauthorized opening by means of a padlock 25 or other lock. The main supply pipe is connected to the building service pipes 26 of the individual consumers by T's 27 or other connectors. The liquid tank 11 of each individual consumer is connected to the pipe 26 which preferably enters the tank in the top of the tank and the liquid flow through the pipe into the tank is controlled by a valve 28 which is operated by a float 29. The liquid level of the tank 11 is automatically maintained at a predetermined height by the float controlled valve so that a space exists above the liquid to permit gasification of the liquid due to the natural heat of the ground in which the tank is buried. However, to assure gasification in cold countries, a water pipe 30 is trained through the tank below the liquid level to supply sufficient heat to vaporize the liquid. A gauge tube 31 rises from the tank and a gauge 32 is mounted on the gauge tube to indicate the gas pressure within the tank.

The gas should be washed to remove all sulphur and other injurious minerals which are detrimental to stoves and other instruments used in the consumption of gas, and for this purpose a tank 33 is provided which is partly filled with water as shown at 34. This tank is known as the regasifier and cleaner. The pipe 35 rises from one end of the liquid tank 11 and above the ground level is equipped with a cut off valve 36 by means of which the flow of gas from the tank 11 to the regasifier may be controlled when repairs and installations are being made. The pipe 35 is also provided with a diaphragm controlled check valve 37, the purpose of which is to regulate to a predetermined pressure before being piped to consuming appliance. Above the check valve the pipe is connected by an elbow 38 to a horizontal pipe 39 which in turn is connected by an elbow 40 to a pipe 41 which extends downwardly in the regasifier and cleaner to nearly the bottom thereof. Thus, gas emerging from the pipe 41 will bubble up through the water and be washed of impurities before accumulating in the space above the water level in the top of the tank 33. Any liquid which may have been carried over with the gas will be gasified in the tank 33 before passing into the house pipe 42.

The gasifying which takes place in the tank 33 produces a back pressure which will close the above mentioned diaphragm controlled valve 37 so that gas will not be admitted again to the tank 33 until the gas therein has been consumed.

A tube 43 rises from the cleaning tank 33 and is equipped with a relief valve 44. This valve is adapted to relieve any overload that might be put on the house pipe 42.

Each individual consumer's supply pipe 26 is equipped with a control valve 44' which is housed in a valve box 45 having a hinged cover 46 which is locked closed by a padlock 47 or other lock.

In operation the central liquid storage tank 10 is filled with butane or other similar liquid and air under pressure is let in on top of the liquid to force the liquid from the tank through the main supply pipe 21 to the consumer's supply pipe 26. The liquid is gasified in the consumer's liquid tank 11 and is conducted through the pipes 35, 39 and 41 to the cleaning tank 33 where impurities are washed from the gas. The gas under suitable pressure passes through the house pipe 42 to the various utensils in which it is to be used. Should the gas pressure rise above a predetermined safe degree the relief valve 44 releases the overload. Prior to operation of the relief valve the diaphragm controlled check valve will automatically shut off the flow of gas from the liquid tank 11 to the cleaner until the gas in the latter has been consumed.

In some instances, air under pressure above the liquid in a full tank may be dispensed with and the vapor pressure due to absorption of heat from the earth will be effective to force liquid from the tank 10 into the small vaporizing tank 11, which likewise absorbs vaporizing heat from the surrounding earth, as hereinbefore stated. It will be understood that liquid from the main tank flows into the vaporizing tank due to a pressure difference and the vaporizing tank is replenished only when vapor is being delivered in accordance with the demand. The vapor pressure in the vaporizing tank will be diminished when vapor is being consumed or delivered at low pressure through the pressure reducing regulator. Therefore, the liquid from the main tank will flow into the vaporizer at a reduced pressure through the small float controlled valve as the gas is consumed. In extremely cold climates when the liquefied gas, below its vaporization temperature, is charged into the tank 10, it is especially desirable to employ air pressure in the tank to start the operation of the system before the liquid has time to absorb vaporizing heat from the earth to generate vapor pressure.

From the above description it is thought that the construction and operation of the invention will be fully understood without further explanation.

What is claimed is:

1. A liquefied gas generating and dispensing system comprising, in combination, a main pressure storage tank buried in the ground in heat exchanging relation with the surrounding earth and adapted to be filled with liquefied gas; a liquid eduction pipe connected to said main storage tank leading underground adapted to supply gas in the liquid phase to separate users; an individual generating tank also buried underground adjacent to each point of use; a branch connecting said eduction pipe to said generating tank; a float controlled valve in the generating tank to maintain a predetermined liquid level therein; a gas service pipe connected to said generating tank; a pressure reducing regulator in said gas service pipe; and a combination liquid contact heat exchanger and gas scrubber connected to the service pipe at its lowest point to revaporize any condensate and to cleanse the gas before it reaches the point of use.

2. In an underground liquefied gas storage and dispensing system, a gas generating tank buried in heat exchanging relation with the surrounding earth; a gas service pipe connected to said tank and having a portion extending underground; and a gas scrubber connected to the service pipe, also in the ground including a closed container partially filled with scrubbing liquid into which the gas service pipe delivers the gas below its level so that the gas bubbles through the liquid and is delivered from above its level to the point of use.

3. In an underground liquefied gas storage and dispensing system, a gas generating tank buried in heat exchanging relation with the surrounding earth; a gas service pipe connected to said tank and having a portion extending underground; a gas scrubber connected to the service pipe at its lowest point including a closed container partially filled with scrubbing liquid into which the gas service pipe delivers the gas below its level so that the gas bubbles through the liquid and is delivered from above its level to the point of use; and a pipe connected to the top of said scrubber container extending above the ground carrying a pressure relief valve to prevent any excessive pressure from being built up in the service pipe.

4. That method of generating and delivering butane vapor of a substantially uniform B. t. u. content for use in household appliances, which comprises charging a quantity of liquid butane under pressure into an underground pressure container; deriving and absorbing heat from the surrounding earth and thereby maintaining the stored liquid under a high pressure due to the absorption of heat from the earth; transferring liquid butane from the bottom portion of the tank to an underground vaporizing chamber; boiling the transferred liquid to generate vapor under pressure by absorbing heat derived from the surrounding earth; dispensing vapor from the vaporizing chamber and simultaneously reducing its pressure; and automatically controlling the flow of liquid from the storage container to the vaporizing chamber as the vapor is dispensed.

5. That method of dispensing butane gas of a substantially uniform heating value from a domestic system which comprises charging a quantity of liquid butane under pressure into a container; maintaining a high pressure in the container due to the temperature of the liquid; delivering liquid from a point near the bottom of the container to an underground vaporizing chamber; employing heat derived from the earth as the sole vaporizing medium for the liquid delivered to the vaporizing chamber and maintaining a vapor pressure therein due to the temperature; conducting vapor from the vaporizing chamber at a reduced pressure to be consumed; and automatically controlling the flow of liquid from the pressure container to the vaporizing chamber in response to the quantity of vapor generated and dispensed.

GEORGE W. LITTLE.